United States Patent [19]

Sherk et al.

[11] 3,841,883
[45] Oct. 15, 1974

[54] $Bi_2O_3$ CONTAINING $PbO$-$ZnO$-$B_2O_3$ LOW TEMPERATURE SEALING GLASS

[75] Inventors: Thomas A. Sherk, West Hurley; Rao R. Tummala, Wappingers Falls, both of N.Y.

[73] Assignee: International Business Machines Corporation, Armonk, N.Y.

[22] Filed: July 31, 1973

[21] Appl. No.: 384,314

[52] U.S. Cl. ................................. 106/53, 106/54
[51] Int. Cl. ......... C03c 3/10, C03c 3/12, C03c 3/30
[58] Field of Search .......................... 106/47 R, 53

[56] References Cited
UNITED STATES PATENTS

| | | | |
|---|---|---|---|
| 2,931,142 | 4/1960 | Veres | 106/53 |
| 3,075,860 | 1/1963 | Veres | 106/53 |
| 3,127,278 | 3/1964 | Francel et al. | 106/53 |
| 3,291,586 | 12/1966 | Chapman et al. | 106/53 |

*Primary Examiner*—Winston A. Douglas
*Assistant Examiner*—Mark Bell
*Attorney, Agent, or Firm*—Edward S. Gershuny

[57] ABSTRACT

A family of sealing glasses which may be used for sealing glass plates together at relatively low temperatures. The glasses all have softening temperatures in the range 415°–428°C and have thermal coefficients of expansion (from room temperature to 300°C) in the range of 80–83 × $10^{-7}$ per °C. The glasses consist substantially of the following constituents in the following proportions:

| | Percent by weight |
|---|---|
| $PbO$ | 60.5–64.0 |
| $B_2O_3$ | 14.5–17.5 |
| $ZnO$ | 14.5–15.2 |
| $SiO_2$ | 1.0– 3.0 |
| $CuO$ | 3.0– 4.5 |
| $Bi_2O_3$ | 1.3– 2.5 |

6 Claims, No Drawings

$Bi_2O_3$ CONTAINING PbO-ZnO-$B_2O_3$ LOW TEMPERATURE SEALING GLASS

INTRODUCTION

This invention relates to sealing glass compositions. More particularly, the invention relates to glasses which have a relatively low softening temperature and have a thermal coefficient of expansion which makes them compatible with soda-lime-silica substrates.

When manufacturing gas panel display devices, one step in the manufacturing process involves the use of a sealing glass to join two prefabricated glass panels together in a fixed spacial relationship. In order to avoid the generation of conditions detrimental to the prefabricated panels, it is desirable that the sealing step be achieved at a relatively low temperature. It is also highly desirable that, as the sealed panels are cooled, both the sealing glass and the glass substrates of the panels undergo substantially the same amount of physical contraction. This is desirable because unequal amounts of contraction would introduce stresses into the sealed unit which could eventually cause cracking of the glass.

SUMMARY OF THE INVENTION

The sealing glasses of this invention consist essentially of the following ingredients in the following proportions:

|       | Per cent by weight |
|-------|--------------------|
| PbO   | 60.5 – 64.0        |
| $B_2O_3$ | 14.5 – 17.5    |
| ZnO   | 14.5 – 15.2        |
| $SiO_2$ | 1.0 – 3.0        |
| CuO   | 3.0 – 4.5          |
| $Bi_2O_3$ | 1.3 – 2.5      |

When any of the sealing glasses of this invention is used in the process of manufacturing a gas display panel, the glass substrate of the prefabricated panels which are sealed together is typically a soda-lime-silica float glass having a thermal coefficient of expansion (TCE) of approximately $92 \times 10^{-7}$ per °C to the set point of the sealing glass (approximately 420°C). Therefore, the sealing glass should preferably have a TCE of approximately 90–94 to its set point. This corresponds to a TCE of approximately 80–84 in the temperature range from room temperature (approximately 22°C) to 300°C. Glasses which are especially suitable for use in this process consist of essentially the following ingredients in the following proportions:

|       | Per cent by weight |
|-------|--------------------|
| PbO   | 61.5 – 64.0        |
| $B_2O_3$ | 14.9 – 15.3    |
| ZnO   | 14.5 – 15.2        |
| $SiO_2$ | 1.0 – 3.0        |
| CuO   | 3.0 – 4.5          |
| $Bi_2O_3$ | 1.3 – 2.5      |

These glasses have softening temperatures in the range 415°–420°C and TCE in the range 82.2 – 83.0 (from room temperature to 300°C). The primary advantages of this invention are that the glasses can be used for sealing at relatively low temperatures and that the glasses have thermal coefficients of expansion that are compatible with the prefabricated panels.

DETAILED DESCRIPTION

All of the glasses described herein consist essentially of ingredients within the ranges shown in the following table.

|       | Per cent by weight |
|-------|--------------------|
| PbO   | 60.5 – 64.0        |
| $B_2O_3$ | 14.5 – 17.5    |
| ZnO   | 14.5 – 15.2        |
| $SiO_2$ | 1.0 – 3.0        |
| CuO   | 3.0 – 4.5          |
| $Bi_2O_3$ | 1.3 – 2.5      |

Examples I–V are five sealing glass compositions which are particularly suitable for use in fabricating gas display panels, especially when using a glass substrate which has a TCE equal to 89. (When thermal coefficients of expansion are given herein, they are expressed in units multiplied $10^{-7}/°C$ and refer to the temperature range from room temperature to 300°C.)

| | Per Cent By Weight | | | | |
|---|---|---|---|---|---|
| | I | II | III | IV | V |
| PbO | 61.5 | 64.0 | 61.0 | 61.6 | 60.5 |
| $B_2O_3$ | 14.9 | 15.3 | 15.0 | 14.5 | 17.5 |
| ZnO | 14.5 | 14.9 | 14.5 | 15.2 | 14.5 |
| $SiO_2$ | 2.6 | 1.5 | 3.0 | 2.5 | 1.0 |
| CuO | 4.0 | 3.0 | 4.0 | 3.8 | 4.5 |
| $Bi_2O_3$ | 2.5 | 1.3 | 2.5 | 2.4 | 2.0 |
| TCE(RT-300) | 82.2 | 83.0 | 80.5 | 81.0 | 80.0 |
| TSoft | 420 | 415 | 425 | 423 | 428 |
| TSeal | 465 | 460 | 470 | 460 | 470 |

It will be noted that all of these glass compositions exhibit a TCE which is quite compatible with that of the glass substrate of the prefabricated panels. It is also of significance that, when using these sealing glasses, the prefabricated panels can be sealed together at a temperature substantially below the crazing temperature of a magnesium oxide overcoat (485–505°C) that results when using any of the dielectric glasses described in examples I–IV of co-pending application Ser. No. 374,189 filed June 27, 1973 for DIELECTRIC GLASS COMPOSITION. (For additional details of the process of manufacturing gas display panels, reference is made to copending application Ser. No. 214,348, filed Dec. 20, 1971 for GAS PANEL FABRICATION by P. H. Haberland et al.)

As compared with sealing glasses known in the prior art, characteristics which particularly distinguish the glasses described above are: the relatively low range of lead oxide (PbO); the relatively high range of zinc oxide (ZnO); and the addition of a relatively small but critically important amount of bismuth oxide ($Bi_2O_3$). The latter ingredient is of particular importance with respect to achieving the low-expansion and low-softening properties of these sealing glasses.

The five glasses described in the above examples are presented in what is regarded as their order of suitability for use in the manufacture of gas display panels. Example V, although it can be used satisfactorily, is substantially less desirable than any of the glasses described in examples I–IV primarily because its softening and sealing temperatures are somewhat high and its TCE is somewhat low as compared to the other glasses. The glasses described in example I–IV, all of which are substantially more desirable than the glass described in example V, consist essentially of the following ingredients in the following proportions:

|  | Per cent by weight |
|---|---|
| PbO | 61.0 – 64.0 |
| $B_2O_3$ | 14.5 – 15.3 |
| ZnO | 14.5 – 15.2 |
| $SiO_2$ | 1.5 – 3.0 |
| CuO | 3.0 – 4.0 |
| $Bi_2O_3$ | 1.3 – 2.5 |

With respect primarily to the three critical parameters of softening temperature, sealing temperature, and TCE, the glasses described in examples 1 and II are substantially more suitable for use in the process of manufacturing gas panel displays than any of the other glasses. These sealing glass compositions consist essentially of the following ingredients in the following proportions:

|  | Per cent by weight |
|---|---|
| PbO | 61.5 – 64.0 |
| $B_2O_3$ | 14.9 – 15.3 |
| ZnO | 14.5 – 14.9 |
| $SiO_2$ | 1.5 – 2.6 |
| CuO | 3.0 – 4.0 |
| $Bi_2O_3$ | 1.3 – 2.5 |

While the invention has been particularly shown and described with reference to preferred embodiments thereof, it will be understood by those skilled in the art that varoius changes in form and details may be made therein without departing from the spirit and scope of the invention.

What is claimed is:

1. A sealing glass composition having a thermal coefficient of expansion (from room temperature to 300°C) in a range of $80-83 \times 10^{-7}$ per °C consisting essentially of the following ingredients in the following proportions:

| | | Per cent by weight |
|---|---|---|
| Lead oxide | (PbO) | 60.5 – 64.0 |
| Boric oxide | ($B_2O_3$) | 14.5 – 17.5 |
| Zinc oxide | (ZnO) | 14.5 – 15.2 |
| Silicon oxide | ($SiO_2$) | 1.0 – 3.0 |
| Copper oxide | (CuO) | 3.0 – 4.5 |
| Bismuth oxide | ($Bi_2O_3$) | 1.3 – 2.5 |

2. A sealing glass composition having a thermal coefficient of expansion (from room temperature to 300°C) in a range of $80-83 \times 10^{-7}$ per °C consisting essentially of the following ingredients in the following proportions:

| | | Per cent by weight |
|---|---|---|
| Lead oxide | (PbO) | 61.0 – 64.0 |
| Boric oxide | ($B_2O_3$) | 14.5 – 15.3 |
| Zinc oxide | (ZnO) | 14.5 – 15.2 |
| Silicon oxide | ($SiO_2$) | 1.5 – 3.0 |
| Copper oxide | (CuO) | 3.0 – 4.0 |
| Bismuth oxide | ($Bi_2O_3$) | 1.3 – 2.5 |

3. The sealing glass composition of claim 2 wherein there is 14.9 – 15.3 percent by weight $B_2O_3$ and 14.5 – 14.9 percent by weight ZnO.

4. A sealing glass composition having a thermal coefficient of expansion (from room temperature to 300°C) in a range of $80-83 \times 10^{-7}$ per °C consisting essentially of the following ingredients in the following proportions:

| | | Per cent by weight |
|---|---|---|
| Lead oxide | (PbO) | 61.5 – 64.0 |
| Boric oxide | ($B_2O_3$) | 14.9 – 15.3 |
| Zinc oxide | (ZnO) | 14.5 – 14.9 |
| Silicon oxide | ($SiO_2$) | 1.5 – 2.6 |
| Copper oxide | (CuO) | 3.0 – 4.0 |
| Bismuth oxide | ($Bi_2O_3$) | 1.3 – 2.5 |

5. A sealing glass composition in accordance with claim 4 consisting essentially of:
61.5 percent PbO, 14.9 percent $B_2O_3$, 14.5 percent ZnO, 2.6 percent $SiO_2$, 4.0 percent CuO and 2.5 percent $Bi_2O_3$.

6. A sealing glass composition in accordance with claim 4 consisting essentially of:
64.0 percent PbO, 15.3 percent $B_2O_3$, 14.9 percent ZnO, 1.5 percent $SiO_2$, 3.0 percent CuO and 1.3 percent $Bi_2O_3$.

* * * * *